United States Patent [19]
Klein

[11] Patent Number: 5,479,411
[45] Date of Patent: Dec. 26, 1995

[54] MULTI-MEDIA INTEGRATED MESSAGE ARRANGEMENT

[75] Inventor: Robert M. Klein, Golden, Colo.

[73] Assignee: AT&T Corp., Murray Hill, N.J.

[21] Appl. No.: 29,193

[22] Filed: Mar. 10, 1993

[51] Int. Cl.⁶ .................................................. H04M 11/06
[52] U.S. Cl. ........................... 370/110.1; 379/88; 379/68; 358/402; 358/403; 358/462
[58] Field of Search .................... 379/88, 89, 94, 379/96, 100, 67, 93, 68; 358/402, 403, 407, 434, 440, 462, 467, 464; 370/110.1; 395/154; 367/197–199; 340/825.36

[56] References Cited

U.S. PATENT DOCUMENTS

| | | | |
|---|---|---|---|
| 4,612,416 | 9/1986 | Emerson et al. | 179/6.11 |
| 4,646,346 | 2/1987 | Emerson et al. | 379/214 |
| 4,694,352 | 9/1987 | Ina et al. | 379/100 |
| 4,837,718 | 6/1989 | Cohen et al. | 379/94 |
| 4,996,707 | 2/1991 | O∝Malley et al. | 358/402 |
| 5,008,926 | 4/1991 | Misboli | 379/89 |
| 5,091,790 | 2/1992 | Silverberg | 358/434 |
| 5,127,003 | 6/1992 | Doll, Jr. et al. | 370/110.1 |
| 5,146,488 | 9/1992 | Okada | 379/89 |
| 5,333,266 | 7/1994 | Boaz et al. | 395/200 |

FOREIGN PATENT DOCUMENTS

| | | | |
|---|---|---|---|
| 0059666 | 9/1982 | European Pat. Off. | H04N 7/04 |
| 0215309 | 3/1987 | European Pat. Off. | H04M 3/50 |
| 0480634 | 4/1992 | European Pat. Off. | H04Q 11/04 |
| 60-30244 | 2/1985 | Japan | H04M 3/00 |
| 03196242 | 8/1991 | Japan | H04L 12/54 |
| 9214314 | 8/1992 | WIPO | H04J 3/00 |

OTHER PUBLICATIONS

U.S. patent application, G. R. Brunson 4, Ser. No. 07/919,674, "Modular Adjunct Processor", Filed Jul. 27, 1992.

U.S. patent application, Brunson–Reeder 2–1, Ser. No. 07/826,345, "Adjunct Processor Embedded in a Switching System", Filed Jan. 27, 1992.

Lee et al., *Voice and Text Messaging–A Concept to Integrate the Services of Telephone and Data Networks*, IEEE International Conference on Communications 88, vol. 1, Jun. 12, 1988, Philadelphia, pp. 408–412.

*Primary Examiner*—Melvin Marcelo
*Assistant Examiner*—Huy D. Vu
*Attorney, Agent, or Firm*—David Volejnicek

[57] ABSTRACT

Voice, facsimile, and electronic mail messaging is integrated in a system (FIG. 1 ) that converts e-mail messages into voice-and-fax messages. An e-mail message (400) is parsed into voiceable, prose, segments (403) and non-voiceable, non-prose, segments (404). Prose segments are converted into voice message segments (503) via text-to-speech facilities. Each non-prose segment is converted into a fax segment (504). Voice pointers (505) to fax segments are inserted into the voice message, in places corresponding to the non-prose segments in the e-mail message. The voice file (500) and fax file (510) are then stored for subsequent delivery of the message as an integrated voice-and-fax message. Conversion of integrated voice-and-fax messages into e-mail messages is likewise envisioned.

28 Claims, 4 Drawing Sheets

MULTI-MEDIA INTEGRATED MESSAGE ARRANGEMENT

TECHNICAL FIELD

This invention relates generally to integrated message systems, and specifically to voice-and-fax message systems and electronic mail systems.

BACKGROUND OF THE INVENTION

Multi-media messaging involves integrating discrete messages or individual message components of different media, e.g., voice, text, video, and the ability to deliver the integrated messages through a single universal mailbox.

The integration of voice and facsimile (fax) messages is well known in the art. For example, U.S. Pat. No. 5,008,926, discloses an integrated voice-and-facsimile store-and-forward message system that provides for the sending, storage, and delivery of voice messages, fax messages, fax messages annotated with voice messages, and voice messages annotated with fax messages. The disclosed system additionally provides for display of fax messages on terminal screens, and the conversion of fax printed text messages into voice messages via text-to-speech conversion facilities.

Electronic mail, or e-mail, systems are also well known in the art. They provide for the sending, storage, and delivery between computer terminals of displayable data—text and/or graphics—messages.

Integration of e-mail systems with voice-and-fax message systems is highly desirable. For example, it is becoming common for salesmen to work out of "mobile offices"—their cars—which are equipped normally with telephones, often with fax machines, but generally not with data terminals, yet the salesmen would like to have the capability of receiving in their mobile offices messages sent to them in any form—voice, fax, or e-mail. The integration of fax and e-mail messaging is readily accomplished through conversion of e-mail messages into fax messages for delivery to their recipients. But while fax machines are more likely to be available to mobile recipients of the messages than data terminals, they are not as readily available as telephones. Therefore, it is often preferable to instead accomplish the integration of voice and e-mail messaging through conversion of e-mail messages into voice messages for delivery to their recipients. This type of conversion is also readily accomplished if the e-mail messages constitute text only.

A problem arises, however, when e-mail messages constitute information other than text—such as diagrams, charts, special symbols, computer code fragments, pictures, etc.—which is not suitable for conversion into a voice message. Attempts to convert such data message segments into speech result in unintelligible garble. This may be avoided by simply identifying and discarding the non-voiceable data message segments, but this results in the delivery of an incomplete message to the recipient—an unacceptable result.

SUMMARY OF THE INVENTION

This invention is directed to solving these and other problems and disadvantages of the prior art. Generally according to the invention, data messaging, such as e-mail messaging, is integrated with audio-and-image messaging, such as voice-and-fax messaging, by converting voiceable segments of a data message into voice message segments, converting non-voiceable segments of the data message into image message segments, and substituting in the voice message voiced pointers to the image message segments in place of the non-voiceable segments. Alternatively, the transformation of the message from one media to another may be done in the reverse direction.

According to specific principles of the invention, segments of information (for example, of a received message) represented in a first medium (for example, e-mail) which can be represented in a second medium (for example, voice) are identified, representation of the identified segments is converted from the first medium into the second medium, representation of other segments of the obtained information is converted from the first medium into a third medium (for example, fax) and then pointers represented in the second medium and pointing to the segments represented in the third medium are interspersed among the segments represented in the second medium. The information represented in the second and third media may then be substituted for the information represented in the first medium.

The conversion of the information from one set of media to another allows the information to be delivered and presented to a user in a form selected by, and most suitable to, the user. Yet, the multi-media form of the message ensures that none of the informational content of the message need be discarded during the conversion process. Thus, for example, a traveling sales representative is able to receive the voice portion of the converted e-mail message on his or her mobile telephone and decide from the contents of the voice portion whether to go to the effort of printing the associated fax component of the message. If the recipient decides to receive the entire message, he or she is able to receive the entire e-mail message as an integrated voice-and-fax message on his or her mobile telephone and fax without loss of any of the information carded by the e-mail message. Furthermore, the pointers used in the multi-media message to point from one medium to the other ensure that the recipient can follow the logical flow of the original message in the multi-media message, and can receive all the information contained in the original message in the proper order.

Preferably, header information of a received e-mail message is converted for delivery to a recipient into a voice header. This allows the recipient to examine and browse through headers of integrated voice-and-fax messages in the same manner as he or she does with headers of conventional voice messages. Further preferably, certain white-space segments of the e-mail message which carry no user information, are discarded during the conversion process. This increases the efficiency and compactness of the resulting integrated voice-and-fax message.

These and other advantages and features of the invention will become more apparent from the following description of an illustrative embodiment of the invention considered together with the drawing.

DETAILED DESCRIPTION

Figure 1:
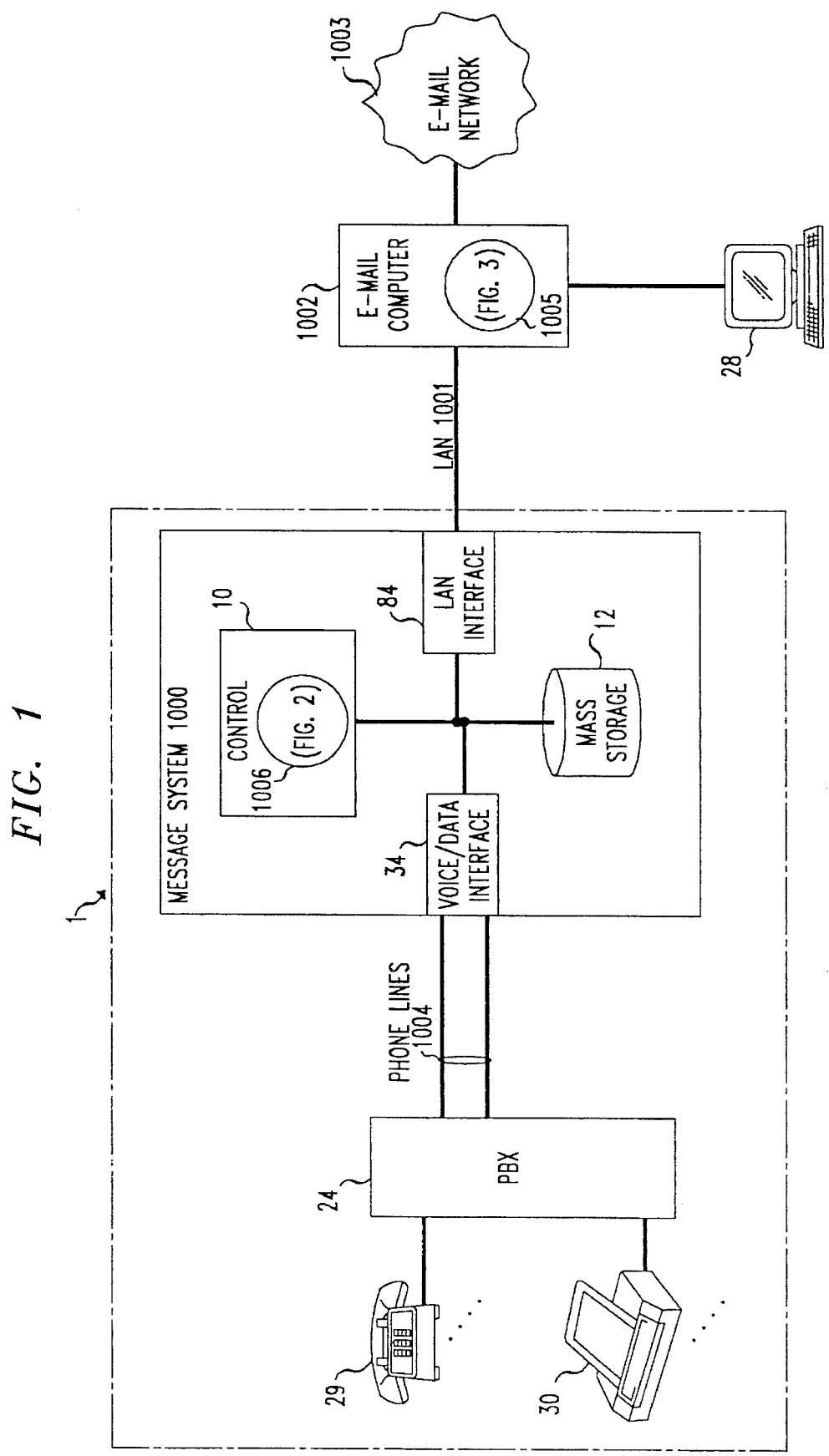
FIG. 1 is a block diagram of a multi-media integrated message system embodying an illustrative example of the invention.

FIG. 1 shows an illustrative telecommunications system. It comprises telephone terminals 29 and fax terminals 30 connected by a private branch exchange switch (PBX) 24 to a message System 1000. Message system 1000 stores voice and fax messages in a mass storage 12, such gas a disk, operating under control of a controller 10. Terminals 29 and 30 access message system 1000 through PBX 24 over phone lines 1004 and a voice/data interface 34 that interfaces phone lines 1004 to the internal circuits and functions of message system 1000, to store the messages in system 1000 and to retrieve the messages from system 1000. Message system 1000 is illustratively the AT&T Ovation multimedia communication system, or an AT&T voice-mail system of the type disclosed in the application of G. R. Brunson and R. D. Reeder entitled "Adjunct Processor Embedded in a Switching System", Ser. No. 07/826,345, filed Jan. 27, 1992, now issued as U.S. Pat. No. 5,311,576 or in the application of G. R. Brunson entitled "Modular Adjunct Processor" Made of Identical Multi-Function Modules Each Innately Unable to Perform the Adjunct-Processor Function But Adaptable Under Direction of One of Them to Perform any of the Adjunct-Processor Functions, Ser. No. 07/919,674, filed Jul. 27, 1992, now issued as U.S. Pat. No. 5,329,579 both of which are assigned to the same assignee as this application, which systems are further adapted to store both voice and fax messages. Alternatively, portion 1 of the system of FIG. 1 which includes terminals 29 and 30, PBX 24, and message system 1000, is illustratively the integrated voice-and-facsimile store-and-forward system disclosed in U.S. Pat. No. 5,008,926, which is hereby incorporated herein by reference.

Figure 2:
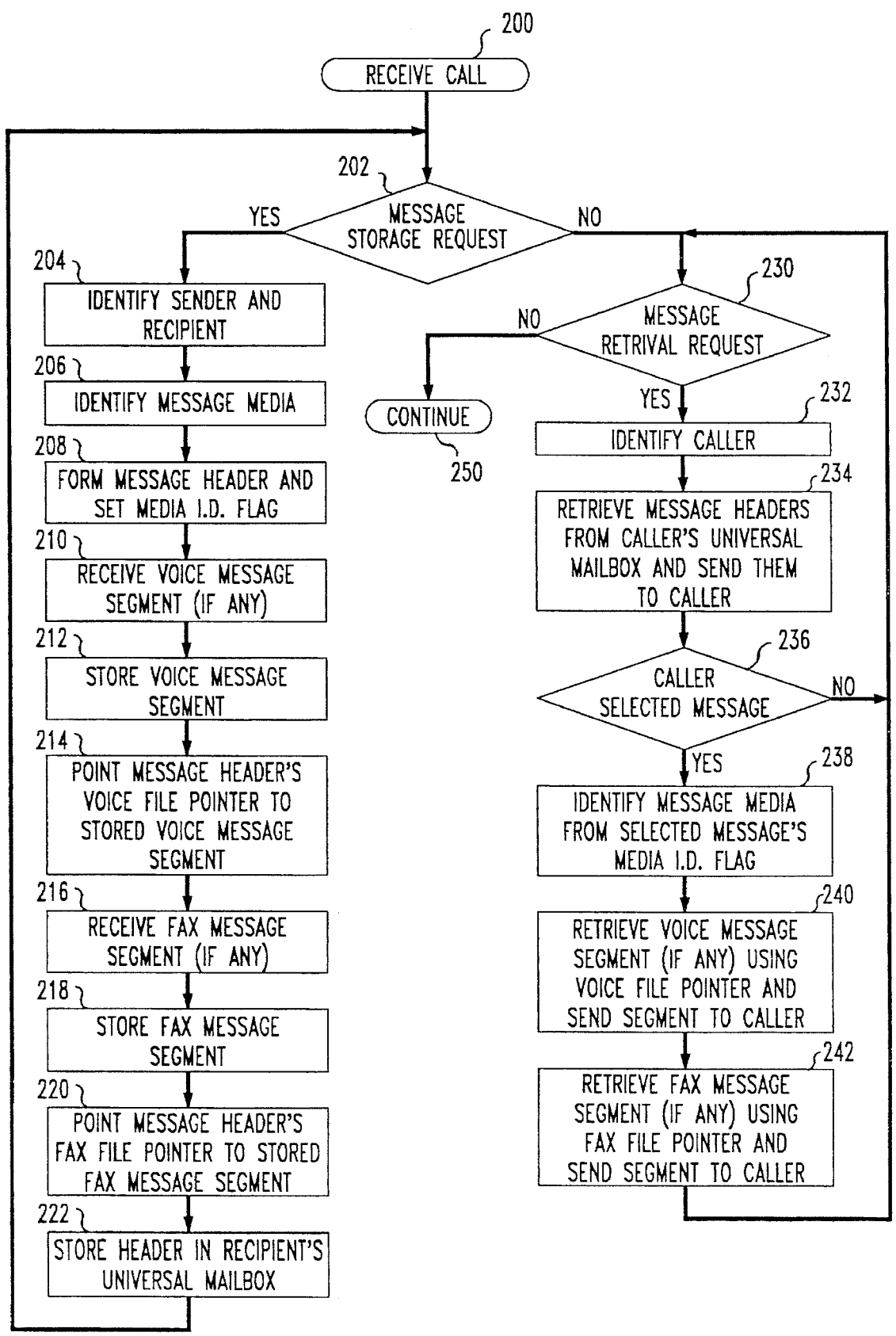
FIG. 2 is a flow diagram of message storing and delivery functions of an integrated voice-and-facsimile store-and-forward system of the multi-media integrated message system of FIG. 1.

While the operation of message system 1000 is described in the above-referenced patent, a brief overview of its functionality relevant hereto is presented here and in FIG. 2 for completeness of description. As mentioned above, message system 1000 operates under the guidance of a control 10. Control 10 is illustratively a general-purpose processor operating under control of programs 1006 stored in its memory. Execution of programs 1006 implements the store-and-forward messaging functionality flowcharted in FIG. 2.

In response to receipt of a call, at step 200 of FIG. 2, control 10 determines from caller input whether or not this is a message storage request, at step 202. If so, control 10 identifies from the caller's input the caller/message sender and the intended message recipient, at step 204, and the message medium or media, at step 206. In this example, the media may be voice, fax, or voice-plus-fax, though other media, such as video, may also be allowed. Control 10 then forms a message header that includes information such as the sender's identification, date and time of receipt of the message, etc., and sets media I.D. flags in the header to indicate the identified message media, at step 208. Control 10 then receives the segment, if any, of the message which is in the voice medium, at step 210, stores the received segment in a file in mass storage 12, at step 212, and sets a voice file pointer in the message header to point to the stored file, at step 214. Control 10 performs the same functions for the segment, if any, of the message which is in the fax medium, at steps 214–220. Control 10 then stores the header in the intended message recipient's universal mailbox in mass storage 12, at step 222, and returns to step 202 to determine if the caller has further requests.

If the caller's request is not to store a message, as determined at step 202, control 10 determines from the caller's input whether this is a message retrieval request, at step 230. If not, control 10 continues its operation with other conventional operations, not relevant hereto, at step 250. If so, control 10 identifies the caller, at step 232, and then retrieves stored message headers from the caller's universal mailbox and sends them to the caller, at step 234. Control 10 then determines from the caller's further input whether the caller has selected a message for retrieval, at step 236. If not, control 10 returns to step 202; if so, control 10 examines the media I.D. flags of the header of the selected message to determine the message's media, at step 238. Control 10 then retrieves the message segments that are in the identified media using the file pointers of the message header, and sends the message segments to the caller, at steps 240–242. Control 10 then returns to step 202.

As shown in FIG. 1, message system 1000 is connected by a local area network (LAN) 1001 to an electronic mail (e-mail) network 1003. LAN 100 is interfaced to the internal circuits and functions of message system 1000 by a LAN interface 84, in a conventional manner such as is disclosed in the above-referenced U.S. Pat. No. 5,008,926.

E-mail network 1003 is a conventional network, comprising a plurality of communicatively interconnected computers including the e-mail computer 1002. Computer 1002 couples data terminals 28 to network 1003, by means of which users can send and retrieve e-mail messages in a conventional manner.

According to the invention, however, an e-mail user who is also served by system portion 1 has the choice of receiving e-mail messages either in the conventional manner, or as integrated voice-and/or-fax messages through portion 1. The user's choice is programmed: into the user's e-mail profile stored by computer 1002. If the user has chosen to receive e-mail messages through portion 1, computer 1002 examines an e-mail message received for that user to determine which segments thereof can be converted into a voice message via text-to-speech functions, and which segments thereof are not amenable to this conversion. The convertible segments are converted into a voice message, and the nonconvertible segments are converted into a fax message. Voice references pointing to the fax message are inserted into the voice message in place of the nonconvertible segments. The voice and fax messages are then delivered to message system 1000 for storage and subsequent delivery to the recipient in the conventional integrated voice-and-fax messaging manner.

Figure 3:
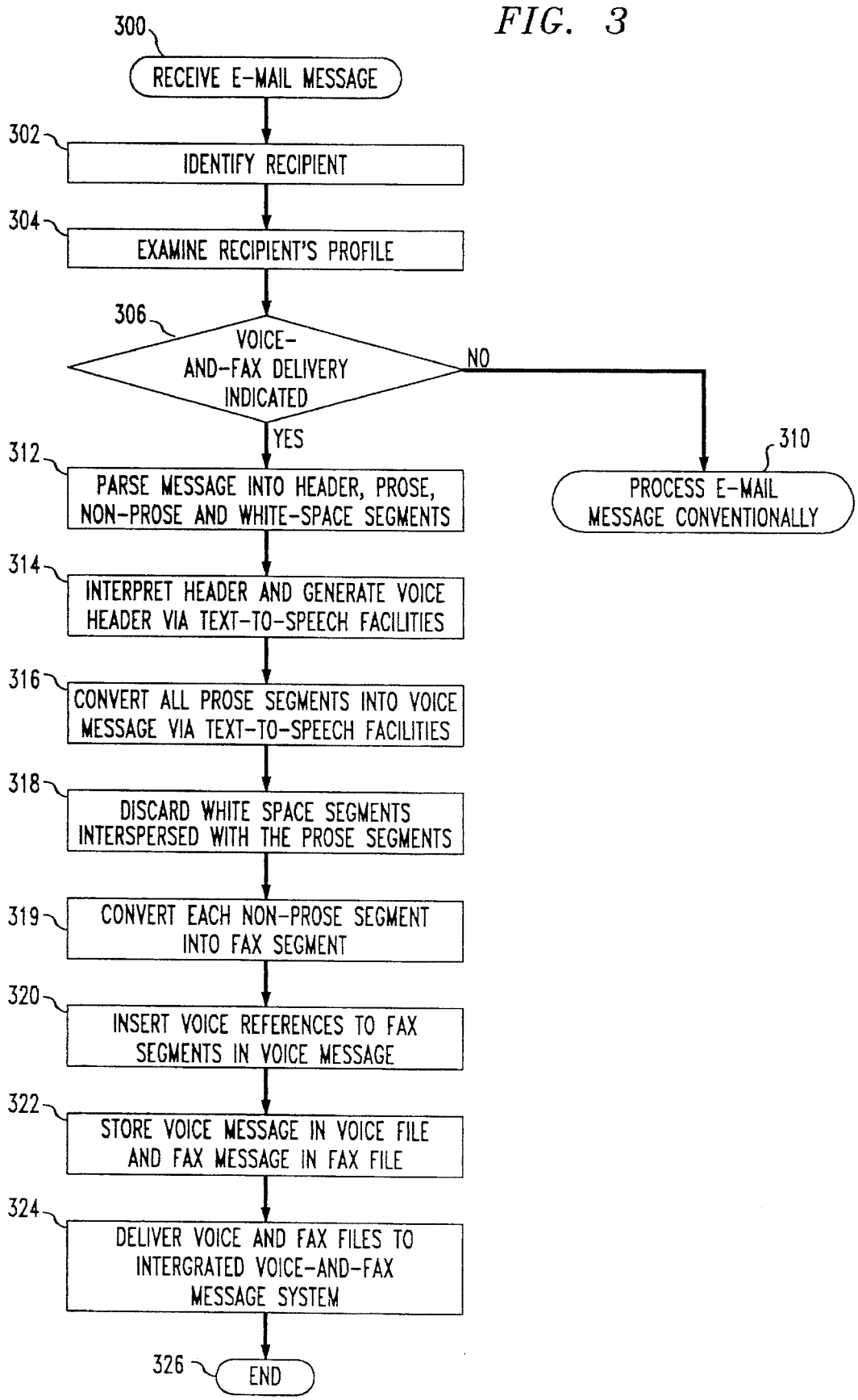
FIG. 3 is a flow diagram of an e-mail message to integrated voice-and-facsimile message conversion function of an e-mail system of the multi-media integrated message system of FIG. 1.

According to the invention, in order to integrate e-mail messages into the integrated voice-and-facsimile store-and-forward system which forms portion 1, computer 1002 executes programs 1005 stored in its memory 1007 that implement the functionality flowcharted in FIG. 3.

In response to receiving an e-mail message for a user served by it, at step 300 of FIG. 3, computer 1002 identifies the recipient in a conventional manner, at step 302, and then examines the identified recipient's stored user profile, at step 304, to determine, at step 306, whether the user wishes to have e-mail messages delivered in the conventional manner via terminal 28 or as integrated voice-and-fax messages via phone and fax terminals 29 and 30 by way of message system 1000. If conventional delivery is indicated, computer 1002 proceeds to handle the received message in the conventional e-mail manner, at step 310.

Figure 4:
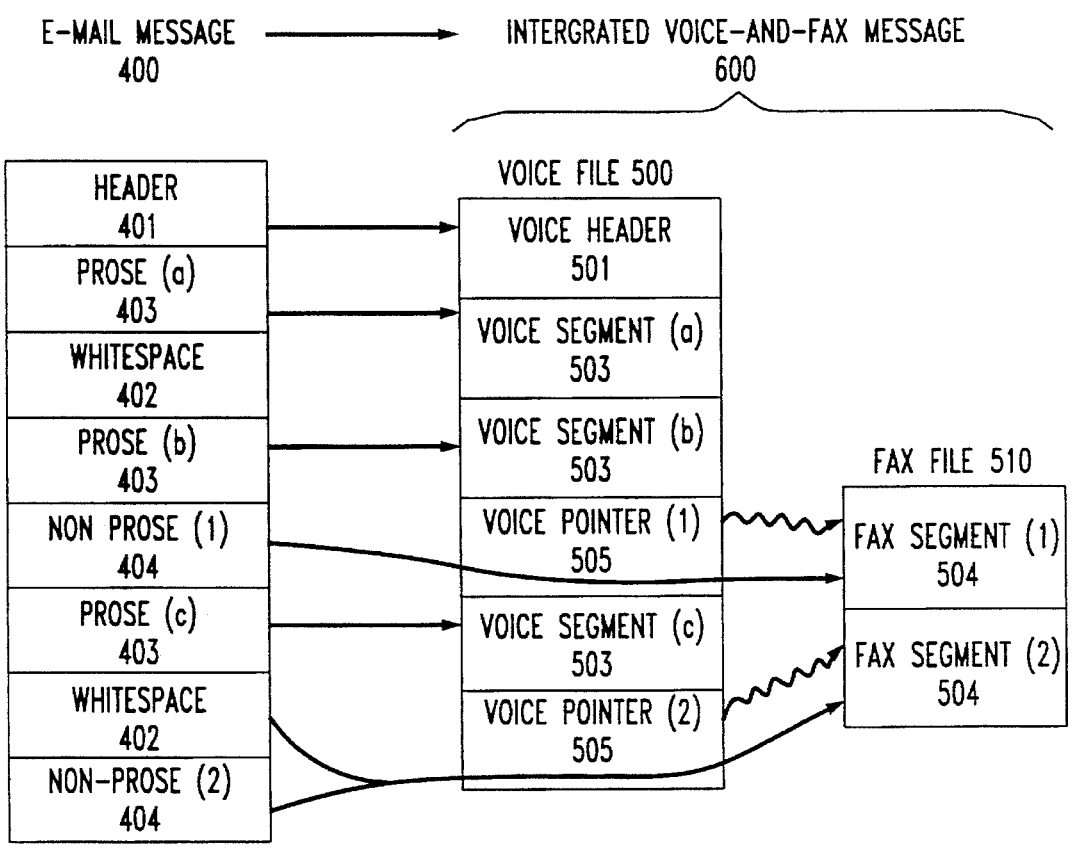
FIG. 4 is a symbolic representation of the e-mail message to integrated voice-and-facsimile message conversion performed by the function of FIG. 3.

If integrated voice-and-fax delivery is indicated, computer 1002 parses the message, at step 312, to separate it into segments classified by type. This is illustrated by the logical conversion diagram of FIG. 4. An e-mail message 400 is an ASCII-format file with a predefined header 401 followed by a sequence of lines of ASCII characters. Besides the header, the following types of segment lines are defined: whitespace 402, consisting of a blank line; prose 403, consisting of natural language or numerals interspaced with standard punctuation; and non-prose 404, which is anything else. Computer 1002 classifies each line of the message into one of the above four types. The header is identified by sentinels predefined for this particular e-mail system (e.g., DATE:, FROM:, SUBJECT:). Whitespace 402 is identified by a lone newline or linefeed character. Prose 403 lines are identified by strings of ASCII characters forming words, numbers, and conventional (natural-language) punctuation. Any lines not identified as header 401, whitespace 402, or prose 403 are classified as non-prose 404. These are, for example, lines containing graphics symbols, nonstandard characters (e.g., bar, angle bracket, ampersand, numerical signs, etc.), nonstandard punctuation or standard punctuation used in nonstandard manner (e.g., a sequence of colons or semicolons), a string that is a mix of letters and numerals, etc.

Having classified each line of the message according to type and thus separated the message into segments 401-404, computer 1002 now interprets the information of header segment 401 to create, via conventional text-to-speech technology, a voice message header 501 conveying that information, at step 314 of FIG. 3. Computer 1002 then converts prose segments 403 into voice message segments 503, again using text-to-speech technology, at step 316. Computer 1002 ignores and discards whitespace segments 402 that are interspersed among prose segments 403, at step 318. Computer 1002 also converts each non-prose segment 404 into a fax segment 504 (such as a fax page), at step 319. Illustratively, computer 1002 does this by first using the ASCII form of the non-prose segment to generate a PostScript file via a utility such as Nroff or Troff, and then converting the PostScript file into standard G3 fax format. Alternatively, the conversion from ASCII to G3 fax bitmap is perforated directly. Computer 1002 retains, as part of the fax, whitespace segments 402 that are surrounded by non-prose segments 404. The handling of whitespace segments 402 is disclosed in detail in the accompanying Appendix, on page 13, line 307, to page 14, line 361. The conversion of non-prose segments 404, including the conversion of whitespace segments 402 that are included among non-prose segments, into fax segments 504 is disclosed in detail in the Appendix on page 19, line 202, to page 20, line 266.

Next, computer 1002 inserts into the voice message, at the places that were occupied in e-mail message 400 by the non-prose segments 404, voice pointers 505 to the appropriate fax segments 504, at step 320. An example of a voice pointer 505 is "Refer to attached document section x". Computer 1002 then stores the voice message with the voice pointers into a voice file 500 in its memory, and stores the fax segments into a fax file 510 in its memory, at step 322. E-mail message 400 has now been convened into the format of integrated voice-and-fax messages dealt with by system 1000, and computer 1002 transfers the voice file 500 and fax file 510 of the integrated voice-and-fax message 600 over LAN 1001 to message system 1000, at step 324, and ends its operation, at step 326. Illustratively, the transfer over LAN is performed by means of an applications programer interface (API) program communicating by means of a utility such as transfer control protocol/Internet protocol (TCIP/IP) remote procedure call (RPC) server function in LAN interface 84. Controller 10 of system 1000 treats LAN 1001 as a caller and stores the message 600 in the manner shown in FIG. 2. Then, upon demand, controller 10 presents message 600 as an integrated voice-and-fax message to the recipient user, also in the manner shown in FIG. 2.

The attached appendix contains a listing of an illustrative example of C-program code that implements the media conversion function described above.

Of course, various changes and modifications to the illustrative embodiment described above will be apparent to those skilled in the art. For example, the conversion of the e-mail message into an integrated voice-and-fax message may be performed at the message originator's computer, in a central conversion host computer in the e-mail system, or in message system 1000. Also, the conversion need not be limited to voice and fax media, but may involve other media such as video. Furthermore, the process may be reversed, whereby received integrated voice-and-fax messages are convened into e-mail messages for delivery. Further still, features may be added to improve the coherence and appearance of the output. For example, sentinels may be included in the e-mail message to direct which components of the e-mail message are to be converted to fax irrespective of whether they are non-pose or prose components. Or, limits may be set on the minimum line size of prose segments that will be converted to voice format; smaller prose segments interspersed with non-prose segments will then be converted to fax. Such changes and modifications can be made without departing from the spirit and the scope of the invention and without diminishing its attendant advantages. It is therefore intended that such changes and modifications be covered by the following claims.

APPENDIX

```
1    #include <stdio.h>
2
3
4
5    extern FILE *popen();
6
7
8    #define MAX_INPUT_LINES 4096
9
10
11   static
12   int
13   read_a_line ( input_file, input_buffer )
14
15   FILE *input_file;
16   char *input_buffer;
17
18   {
19           int c;
20           char *cptr;
21
22           cptr = input_buffer;
23
24           while ((c = fgetc(input_file)) != EOF) {
25                   if (c == '\n') {
26                           *cptr++ = '\n';
27                           *cptr = '\0';
28                           return(1);
29                           };
30
31                   *cptr++ = c;
32                   };
33
34           return(0);
35   }
36
37
38
39
40
41
42   /* get_type:   return 'P' if line contains prose which is convertible to
43                 synthesized speech, return 'W' if it is a whitespace line,
44                 otherwise return 'N' */
45
46   int
47   get_type ( input_line )
48
49   char *input_line;
50
51   {
52           char *cptr;     /* current character pointer */
53           char *ncptr;    /* next character pointer */
54           int whitespace_only;
55
56           /* scan the input line until you find something that readily rules
```

```
57          out this line as prose.  If you find nothing that explicitly
58          disqualifies this line as prose then assume that it is parsable
59          by the text-to-speech software */
60
61      cptr = input_line;
62      ncptr = cptr+1;
63
64      whitespace_only = 1;
65
66      while (*cptr != '\n') {
67              char c;
68              char nc;
69
70              c = *cptr;
71              nc = *ncptr;
72
73              /* if current character is whitespace let it pass */
74
75              if ((c == ' ') ||
76                  (c == '\t'))
77                      goto pass_current_char;
78
79              /* if current character is alphanumeric let it pass */
80
81              if ( ((c >= 'a') && (c <= 'z')) ||
82                   ((c >= 'A') && (c <= 'Z')) ||
83                   ((c >= '0') && (c <= '9'))) {
84                      whitespace_only = 0;
85                      goto pass_current_char;
86                      };
87
88              /* if current character is standard punctuation let it pass
89                 as long as the next char is either whitespace or an
90                 alphanumeric character */
91
92              if ((c == '.') || (c == ',') ||
93                  (c == '\'') || (c == '"') || (c == '$') || (c == '!') ||
94                  (c == '?') || (c == '-')) {
95
96                      whitespace_only = 0;
97
98                      /* if next character is alphanumeric let it pass */
99
100                     if ( ((nc >= 'a') && (nc <= 'z')) ||
101                          ((nc >= 'A') && (nc <= 'Z')) ||
102                          ((nc >= '0') && (nc <= '9')))
103                             goto pass_current_char;
104
105                     /* if next character is whitespace let it pass */
106
107                     if ((nc == ' ') ||
108                         (nc == '\t'))
109                             goto pass_current_char;
110
111                     /* if next character is the end of the line let it pass */
112
```

```
113                             if (nc == '\n')
114                                     goto pass_current_char;
115                             };
116
117                     /* reject this line because of a non-synthesizable
118                        sequence of characters */
119
120                     return((int)'N');
121
122             pass_current_char:
123
124                     cptr++;
125                     ncptr++;
126                     };
127
128         if (whitespace_only)
129                 return((int)'W');
130
131         return((int)'P'); /* assume input line is prose */
132 }
133
134
135
136
137 /* text_to_voice_and_fax:        convert the input E-mail data into a combined
138                                 voice and fax (multi-media) message. The
139                                 algorithm always generates a voice file on
140                                 output and may generate a fax file if it
141                                 is necessary to contain non-prose material
142                                 included in the E-mail message.  If a fax
143                                 file is generated the function returns the
144                                 number of fax pages created, otherwise it
145                                 returns 0. */
146
147 int
148 text_to_voice_and_fax ( input_file, voice_file, fax_file )
149
150 char *input_file;
151 FILE *voice_file;
152 FILE *fax_file;
153
154 {
155         char line_type[MAX_INPUT_LINES]; /* 'P' == prose line
156                                             'N' == non-prose line
157                                             'W' == whitespace line */
158         int nbr_lines;
159         FILE *temp_voice_data;
160         FILE *temp_fax_data;
161         char temp_voice[64];
162         char temp_fax[64];
163         char input_line[256];
164         char convert_cmd[128];
165         char data_buf[8192];
166         int nbytes;
167         int nbr_fax_pages;
168         int nbr_fax_segments;
```

```
169         int i;       Y, w1, W2;
170         int X,       (1, w2)
171                       ^
172         nbr_fax_pages = 0;
173         nbr_fax_segments = 0;
174
175         sprintf(temp_voice,"/tmp/ttvf.v.%d",getpid());
176         sprintf(temp_fax,"/tmp/ttvf.f.%d",getpid());
177
178         temp_voice_data = fopen(temp_voice,"w");
179         temp_fax_data = fopen(temp_fax,"w");
180
181         if ((temp_voice_data == NULL) || (temp_fax_data == NULL)) {
182                 fprintf(stderr,"ttvf: cannot create temp fax/voice files\n");
    return(-1);
183                 };
184
185         /* scan the input file and classify all lines as 'P', 'N', or 'W' */
186
187         nbr_lines = 0;
188
189         while (read_a_line(input_file,input_line)) {
190                 line_type[nbr_lines] = get_type(input_line);
191                 nbr_lines++;
192                 };
193
194         /* massage line type sequences to make the output coherent and "pretty" */
195
196         /* all whitespace lines are converted to 'P' or 'N' lines depending upon w
here they
197            appear in relation to neighboring 'P' or 'N' sequences according to the
following
198            conversion rules:
199
200                     X w Y
201                     begWP...        W --> P
202                     begWN           W --> N
203                     ....PWeof       W --> P
204                     ....NWeof       W --> N
205
206                     ...NWN...       W --> N
207                     ...PWP...       W --> P
208                     ...PWN...       W --> N
209                     ...NWP...       W --> N               */
210
211         w1 = w2 = X = Y = 0;
212
213         for (i=0; i<nbr_lines; i++) {
214                 if (line_type[i] =='W') {
215                         w1 = w2 = i;
216
217                         while ((line_type[i+1] == 'W') && (i<nbr_lines))
218                                 w2 = ++i;
219
220                         if (i < (nbr_lines-1))
221                                 Y = line_type[i+1];
222                         else
223                                 Y = 0;
224
```

```
225             /* values for X w1.. w2 Y are set, determine which whitesp
ace conversion
226                rule applies and convert all of the whitespace lines to
'N' or 'P' */
227
228             /*      begWP...         W --> P */
229
230             if ((X==0) && (Y=='P')) {
231                     int j;
232
233                     for (j=w1; j<=w2; j++)
234                             line_type[j] = 'P';
235             }
236
237             /*      begWN            W --> N */
238
239             else if ((X==0) && (Y=='N')) {
240                     int j;
241
242                     for (j=w1; j<=w2; j++)
243                             line_type[j] = 'N';
244             }
245
246             /*      ....PWeof        W --> P */
247
248             else if ((X=='P') && (Y==0)) {
249                     int j;
250
251                     for (j=w1; j<=w2; j++)
252                             line_type[j] = 'P';
253             }
254
255             /*      ....NWeof        W --> N */
256
257             else if ((X=='N') && (Y==0)) {
258                     int j;
259
260                     for (j=w1; j<=w2; j++)
261                             line_type[j] = 'N';
262             }
263
264             /*      ...NWN...        W --> N */
265
266             else if ((X=='N') && (Y=='N')) {
267                     int j;
268
269                     for (j=w1; j<=w2; j++)
270                             line_type[j] = 'N';
271             }
272
273             /*      ...PWP...        W --> P */
274
275             else if ((X=='P') && (Y=='P')) {
276                     int j;
277
278                     for (j=w1; j<=w2; j++)
279                             line_type[j] = 'P';
280             }
```

```
281
282                    /*        ...PWN...        W --> N */
283
284                    else if ((X=='P') && (Y=='N')) {
285                            int j;
286
287                            for (j=w1; j<=w2; j++)
288                                    line_type[j] = 'N';
289                            }
290
291                    /*        ...NWP...        W --> N */
292
293                    else if ((X=='N') && (Y=='P')) {
294                            int j;
295
296                            for (j=w1; j<=w2; j++)
297                                    line_type[j] = 'N';
298                            }
299
300                    else {
301                            fprintf(stderr,"ttvf: internal error, line_type confusion?\n");
302                            return(-1);
303                            };
304                    };
305
306            X = line_type[i];
307            };
308
309    /* look for sequences in which 1 line of prose is surrounded by fax in which case you
310       may want to include the prose into the fax component to make it look "prettier". */
311
312    /*      NPN      P --> N */
313
314    for (i=1; i<(nbr_lines-1); i++) {
315            if ((line_type[i-1] == 'N') &&
316                (line_type[i] == 'P') &&
317                (line_type[i+1] == 'N'))
318                    line_type[i] = 'N';
319            };
320
321    /* look for sequences in which 1 line of fax is surrounded by prose in which case you
322       may want to include the fax into the prose component even though the text-to-speech
323       may sound a little funny.  It is not likely that you have a real fax image in this
324       situation and displaying it a such may not look appropriate. */
325
326    /*      PNP      N --> P */
327
328    for (i=1; i<(nbr_lines-1); i++) {
329            if ((line_type[i-1] == 'P') &&
330                (line_type[i] == 'N') &&
331                (line_type[i+1] == 'P'))
332                    line_type[i] = 'P';
333            };
334
335    fseek(input_file,0L,0); /* reset input file */
336
```

```
337             nbr_lines = 0;
338
339             while (read_a_line(input_file,input_line)) {
340
341                     /* at this point line_type is either 'P' or 'N' since we
342                        attached all whitespace lines to prose/non-prose sections */
343
344                     if (line_type[nbr_lines] == 'P')
345                             fprintf(temp_voice_data,"%s",input_line);
346                     else {
347                             if ((nbr_lines == 0) || (line_type[nbr_lines-1] != 'N')) {
348                                     nbr_fax_segments++;
349
350                                     fprintf(temp_voice_data,"Please refer to attached document section %d.\n",
351                                             nbr_fax_segments);
352
353                                     fprintf(temp_fax_data,"\n\n*** ******************
** Section %d ***********************\n\n",
354                                             nbr_fax_segments);
355                             };
356
357                             fprintf(temp_fax_data,"%s",input_line);
358                     };
359
360                     nbr_lines++;
361             };
362
363             fclose(temp_voice_data);
364             fclose(temp_fax_data);
365
366             /* create voice and fax components of message data */
367
368             /* perform text to fax conversion if necessary */
369
370             if (nbr_fax_segments > 0) {
371                     temp_fax_data = fopen(temp_fax,"r");
372
373                     nbr_fax_pages = text_to_fax(temp_fax_data,fax_file);
374
375                     fclose(temp_fax_data);
376             };
377
378             /* perform text to voice conversion */
379
380             sprintf(convert_cmd,
381                     "express -U -i -A1 - < %s 2>/dev/null | rctopcm -8 -f8000",
382                     temp_voice);
383
384             temp_voice_data = popen(convert_cmd,"r");
385
386             while ((nbytes=fread(data_buf,1,8192,temp_voice_data)) > 0)
387                     fwrite(data_buf,1,nbytes,voice_file);
388
389             pclose(temp_voice_data);
390
391             unlink(temp_voice);
392             unlink(temp_fax);
```

```
393
394         return(nbr_fax_pages);
395    }
```

```
1   /* text_to_fax: convert a text file into a G3 format fax file suitable for
2              printing as an 8.5x11 inch fax document (of 1 or more pages
3              in length).  The input file is specified as argv[1] or is assumed
4              to be stdin.  The output file is always stdout. */
5
6
7
8   #define MAX_LINE_LEN      82
9   #define LINES_PER_PAGE    66
10  #define TAB_STOP          8
11
12
13  #include "font.h"
14  #include "g3.h"
15
16
17  #include <stdio.h>
18
19  extern int errno;
20
21
22  static void tofax();
23  static void putwhitespan();
24  static void putblackspan();
25  static void putcode();
26  static void puteol();
27  static void putinit();
28  static void putbit();
29  static void flushbits();
30
31
32  static char line_bits[MAX_LINE_LEN*FONT_WIDTH];
33  static char blank_line[MAX_LINE_LEN*FONT_WIDTH];
34  static i c nbr_horiz_pixels;
35
36  static FILE *output_file = NULL;
37
38  /* output_line_to_g3:   output specified line to g3 file and return
39                          number of vertical pixels output. */
40
41  static
42  int
43  output_line_to_g3 ( buf, nchars )
44
45  char *buf;
46  int nchars;
47
48  {
49          unsigned char output_char;
50          int vert_index;
51          int char_line;
52          int nbits;
53
54          /* output TOP_SPACE lines */
55
56          for (vert_index=0; vert_index < TOP_SPACE; vert_index++)
```

```
 57                        tofax(blank_line,nbr_horiz_pixels);
 58
 59            /* output character data lines */
 60
 61            char_line = 0;
 62
 63            for (; vert_index<(TOP_SPACE+CHAR_HEIGHT); vert_index++) {
 64                    int char_nbr;
 65                    char *cptr;
 66
 67                    cptr = buf;
 68
 69                    nbits = 0;
 70
 71                    for(char_nbr=0; char_nbr<nchars; char_nbr++) {
 72                            int i;
 73                            for (i=0; i<LEFT_SPACE; i++)
 74                                    line_bits[nbits++] = 0;
 75
 76                            output_char = char_font[*cptr][char_line];
 77
 78                            for (i=1; i<=CHAR_WIDTH; i++)
 79                                    line_bits[nbits++] = ((output_char>>(BITS_PER_CHAR
-i))&0x1);
 80
 81                            for (i=0; i<RIGHT_SPACE; i++)
 82                                    line_bits[nbits++] = 0;
 83
 84                            cptr++;
 85                    };
 86
 87                    while (nbits < nbr_horiz_pixels) {
 88                            line_bits[nbits++] = 0;
 89                    };
 90
 91                    /* output raster line data */
 92
 93                    tofax(line_bits,nbits);
 94
 95                    char_line++;
 96            };
 97
 98            /* output BOTTOM_SPACE lines */
 99
100            for(; vert_index<(TOP_SPACE+CHAR_HEIGHT+BOTTOM_SPACE); vert_index++)
101                    tofax(blank_line,nbr_horiz_pixels);
102
103            return(vert_index);
104    }
105
106
107
108
109
110
111    /* output_new_page:      output new page marker/sentinnel and return number of
112                             vertical pixels output. Output is in PBM format. */
```

```
113
114     static
115     int
116     output_new_page ( )
117
118     {
119             int nbits;
120
121             nbits = 0;
122
123             while (nbits < nbr_horiz_pixels) {
124                     line_bits[nbits] = 1;
125                     nbits++;
126                     };
127
128             tofax(line_bits,nbits);
129
130             return(1);
131     }
132
133
134
135
136
137
138     /* get_a_line:   read a line of input and put data into buf, truncate all
139                     characters after max_line_len.  return -1 on EOF */
140
141     static
142     int
143     get_a_line ( file, buf, max_len )
144
145     FILE *file;
146     char *buf;
147     int max_len;
148
149     {
150             int nchars;
151             int position;
152             int c;
153             char *bptr;
154
155             nchars = 0;
156             position = 0;
157             bptr = buf;
158
159             while (c = fgetc(file)) {
160                     if ((c == EOF) && (nchars > 0))
161                             break;
162
163                     else if (c == EOF)
164                             return(-1);
165
166                     else if (c == '\n')
167                             break;
168
```

```
169                     if (++nchars > max_len)
170                             continue;
171
172                     /* expand tab character */
173
174                     if (c == '\t') {
175                             *bptr++ = ' ';
176                             position++;
177
178                             while ((nchars <= max_len) && ((position%TAB_STOP) != 0))
179                                     *bptr++ = ' ';
180                                     nchars++;
181                                     position++;
182                                     };
183                             }
184                     else {
185                             *bptr++ = c;
186                             position++;
187                             };
188                     };
189
190
191             if (nchars > max_len)
192                     return(max_len);
193             else
194                     return(nchars);
195     }
196
197
198
199
200
201
202     /* text_to_fax: convert the ascii data in the input file into G3
203                     format bitmap data suitable for 8.5x11 fax documents.
204                     this function returns the number of pages generated. */
205
206     int
207     text_to_fax ( input_file, output_file_ptr )
208
209     FILE *input_file;
210     FILE *output_file_ptr;
211
212     {
213             int nbr_chars;
214             int nbr_lines;
215             int nbr_pages;
216             char input_buf[MAX_LINE_LEN];
217             int i;
218
219             output_file = output_file_ptr;
220
221             nbr_lines = 0;
222             nbr_pages = 0;
223
224             /* output G3 header information */
```

```
225
226             nbr_horiz_pixels = MAX_LINE_LEN*FONT_WIDTH;
227
228             putinit();
229             puteol();
230
231             for (i=0; i<nbr_horiz_pixels; i++)
232                     blank_line[i] = 0;
233
234             tofax(blank_line,nbr_horiz_pixels);
235             tofax(blank_line,nbr_horiz_pixels);
236             tofax(blank_line,nbr_horiz_pixels);
237             tofax(blank_line,nbr_horiz_pixels);
238
239
240             while ((nbr_chars=get_a_line(input_file,input_buf,MAX_LINE_LEN)) >= 0) {
241
242                     output_line_to_g3(input_buf,nbr_chars);
243
244                     nbr_lines++;
245
246                     if ((nbr_lines%LINES_PER_PAGE) == 0) {
247                             output_new_page();
248                             nbr_pages++;
249                             };
250                     };
251
252             while ((nbr_lines%LINES_PER_PAGE) != 0) {
253                     output_line_to_g3(input_buf,0);
254
255                     nbr_lines++;
256                     };
257
258             output_new_page();
259             nbr_pages++;
260
261             for (i=0; i<6; i++)
262                     puteol();
263             flushbits();
264
265             return(nbr_pages);
266     }
267
268     static void
269     tofax(bitrow,n)
270         unsigned char *bitrow;
271         int n;
272     {
273         int c;
274
275         while(n>0) {
276             c = 0;
277             while(*bitrow == 0 && n>0) {
278                 ++bitrow;
279                 ++c;
280                 --n;
```

```
281             }
282             putwhitespan(c);
283             c = 0;
284             if(n==0)
285                 break;
286             while(*bitrow == 1 && n>0) {
287                 ++bitrow;
288                 ++c;
289                 --n;
290             }
291             putblackspan(c);
292         }
293         puteol();
294     }
295
296     static void
297     putwhitespan(c)
298         int c;
299     {
300         int tpos;
 01         tableentry* te;
302
303         if(c>=64) {
304             tpos = (c/64)-1;
305             te = mwtable+tpos;
306             c -= te->count;
307             putcode(te);
308         }
309         tpos = c;
310         te = twtable+tpos;
311         putcode(te);
312     }
313
314     static void
315     putblackspan(c)
316         int c;
317     {
318         int tpos;
319         tableentry* te;
320
321         if(c>=64) {
322             tpos = (c/64)-1;
323             te = mbtable+tpos;
324             c -= te->count;
325             putcode(te);
326         }
327         tpos = c;
328         te = tbtable+tpos;
329         putcode(te);
330     }
331
332     static void
333     putcode(te)
334         tableentry* te;
335     {
336         unsigned int mask;
```

```
337         int code;
338
339         mask = 1<<(te->length-1);
340         code = te->code;
341         while(mask) {
342             if(code&mask)
343                 putbit(1);
344             else
345                 putbit(0);
346             mask >>= 1;
347         }
348
349     }
350
351     static void
352     puteol()
353     {
354         int i;
355
356         for(i=0; i<11; ++i)
357             putbit(0);
358         putbit(1);
359     }
360
361     static int shdata;
362     static int shbit;
363
364     static void
365     putinit()
366     {
367         shdata = 0;
368         shbit = 0x80;
369     }
370
371     static void
372     putbit(d)
373     int d;
374     {
375         if(d)
376             shdata = shdata|shbit;
377         shbit = shbit>>1;
378         if((shbit&0xff) == 0) {
379             fputc(shdata,output_file);
380             shdata = 0;
381             shbit = 0x80;
382         }
383     }
384
385     static void
386     flushbits( )
387     {
388         if ( shbit != 0x80 ) {
389             fputc(shdata,output_file);
390             shdata = 0;
391             shbit = 0x80;
392         }
393     }
```

I claim:

1. A method of media conversion, comprising the steps of:

identifying segments of textual information in a message comprising a sequence of segments of information represented in a first visually presentable form, which identified segments can be represented in an auditorily presentable form;

converting representation of the identified segments from the first visually presentable form into the auditorily presentable form;

converting representation of other segments of the sequence of segments of information of said message from the first visually presentable form into a second visually presentable form;

interspersing pointers, represented in the auditorily presentable form and pointing to the segments represented in the second visually presentable form, among the segments represented in the auditorily presentable form such that each pointer pointing to a corresponding segment represented is the second visually presentable form takes a place of said corresponding segment in said sequence among the segments represented in the auditorily presentable form; and collectively presenting the segments represented in the second visually presentable form and the sequence of the segments represented in the auditorily presentable form with interspersed said pointers represented in the auditorily presentable form as a multi-media message to a user.

2. The method of claim 1 wherein:

the step of identifying is preceded by the step of obtaining the message comprising the sequence of segments of information represented in the first visually presentable form; and the step of interspersing pointers comprises the step of substituting the information represented in the auditorily presentable form and the second visually presentable form for the information represented in the first visually presentable form.

3. The method of claim 1 wherein:

the first visually presentable form comprises data; and the auditorily presentable form comprises voice and the second visually presentable form comprises image.

4. The method of claim 1 wherein the step of converting representation of other segments comprises the step of:

identifying the other segments of information of the message represented in the first visually presentable form which can be represented in the second visually presentable form.

5. A messaging method comprising the steps of: obtaining an e-mail message; identifying segments of the obtained e-mail message that can be converted into voice message segments; convening the identified segments into voice message segments; converting other segments of the e-mail message into fax message segments;

interspersing voice pointers to the fax message segments among the voice message segments; and delivering the received message as an integrated voice-and-fax message comprising the fax message segments and the voice message segments interspersed with the voice pointers.

6. The method of claim 5 wherein the step of convening other segments comprises the steps of:

selecting other segments of the e-mail message that are not to be discarded;

convening the selected segments into the fax message segments; and discarding segments of the obtained message other than the identified and the selected segments.

7. A messaging method comprising the steps of:

receiving an e-mail message;

parsing the received message into header, whitespace, prose, and non-prose segments;

convening the header segment into a voice header segment;

convening the prose segments into voice message segments;

convening the non-prose segments into fax message segments;

inserting among re voice message segments, at places occupied in the received e-mail message by the non-prose segments, voice pointers to the fax message segments; and delivering the received message to a recipient as an integrated voice-and-fax message comprising a voice message that includes the voice header segments, the voice message segments, and the inserted voice pointers, and further comprising a fax message that includes the fax segments.

8. The method of claim 7 further comprising the step of:

discarding the whitespace segments except those that are surrounded by the non-prose segments.

9. A method of media conversion comprising the steps of:

obtaining a multi-media message comprising a sequence of information segments including graphical information segments represented in a first visually presentable form, textual information segments represented in an auditorily presentable form, arid pointers represented in the auditorily presentable form and pointing to the graphical information segments, the pointers being interspersed among the textual information segments represented in the auditorily presentable form such that the textual information segments represented in the auditorily presentable form with the interspersed pointers together define said sequence of information segments in the multi-media message;

converting representation of the graphical information segments from the first visually presentable form into a second visually presentable form;

converting representation of the textual information segments from the auditorily presentable form into the second visually presentable form; and interspersing the graphical information segments represented in the second visually presentable form among the textual information segments represented in the second visually presentable form in place of the pointers such that each pointer pointing to a corresponding graphical information segment is replaced by said corresponding graphical information segment in the second visually presentable form in said sequence among the textual information segments represented in the second visually presentable form; and collectively presenting said sequence of the textual information segments represented in the second visually presentable form and the graphical information segments represented in the second visually presentable form in place of said multi-media message to a user.

10. The method of claim 9 wherein:

the step of obtaining comprises the step of receiving an integrated voice-and-fax message comprising a fax file including fax message segments and a voice file including voice message segments interspersed with pointers to the fax message segments;

the step of converting representation of the graphical information segments comprises the step of converting the fax message segments into e-mail message segments;

the step of converting representation of the textual information segments comprises the step of converting the voice message segments into e-mail message segments;

the step of interspersing comprises the step of inserting the e-mail message segments converted from the fax message segments among the e-mail message segments converted from the voice message segments in place of the voice pointers; and the step of collectively presenting includes the step of delivering to a recipient an e-mail message comprising the e-mail message segments converted from the voice message segments and interspersed with the e-mail message segments converted from the fax message segments, instead of the received message.

11. A media-conversion arrangement comprising:

means for identifying segments of textual information in a message comprising a sequence of segments of information represented in a first visually presentable form, which identified segments can be represented in an auditorily presentable form;

processor means for converting representation of the identified segments from the first visually presentable form into the auditorily presentable form;

processor means for converting representation of other segments of the sequence of segments of information of the message from the first visually presentable form into a second visually presentable form;

means for interspersing pointers, represented in the auditorily presentable form and pointing to the segments represented in the second visually presentable form, among the segments represented in the auditorily presentable form such that each pointer pointing to a corresponding segment represented in the second visually presentable form takes a place of said corresponding segment in said sequence among the segments represented in the auditorily presentable form; and means for collectively presenting the segments represented in the second visually presentable form and the segments represented in the auditorily presentable form with interspersed said pointers represented in the auditorily presentable form as a multi-media message to a user.

12. The arrangement of claim 11 further comprising:

means for obtaining the message comprising the sequence of segments of information represented in the first visually presentable form; and means for substituting the information represented in the auditorily presentable form and the second visually presentable form for the information represented in the first visually presentable form.

13. The arrangement of claim 11 wherein:

the first visually presentable form comprises data; and the auditorily presentable form comprises voice and the second visually presentable form comprises image.

14. The arrangement of claim 11 wherein the means for converting representation of other segments comprise:

means for identifying the other segments of information of the message represented in the first visually presentable form which can be represented in the second visually presentable form.

15. A messaging arrangement comprising:

means for obtaining an e-mail message;

means for identifying segments of the obtained e-mail message that can be converted into voice message segments;

processor means for convening the identified segments into voice message segments;

processor means for converting other segments of the e-mail message into fax message segments;

means for interspersing voice pointers to the fax message segments among the voice message segments; and means for delivering the received message as an integrated voice-and-fax message comprising the fax message segments and the voice message segments interspersed with the voice pointers.

16. The arrangement of claim 15 wherein the means for converting other segments comprise:

means for selecting other segments of the e-mail message that are not to be discarded;

means for convening the selected segments into the fax message segments; and means for discarding segments of the obtained message other than the identified and the selected segments.

17. A messaging arrangement comprising:

means for receiving; an e-mail message;

processing means for parsing the received message into header, whitespace, prose, and non-prose segments;

processing means for converting the header segment into a voice header segment;

processing means for converting the prose segments into voice message segments;

processing means for converting the non-prose segments into fax message segments;

means for inserting among the voice message segments, at places occupied in the received e-mail message by the non-prose segments, voice pointers to the fax message segments; and means for delivering the received message to a recipient as an integrated voice-and-fax message comprising a voice message that includes the voice header segments, the voice message segments; and the inserted voice pointers, and further comprising a fax message that includes the fax segments.

18. The arrangement of claim 17 further comprising:

means for discarding the whitespace segments except those that are surrounded by the non-prose segments.

19. A media conversion arrangement comprising:

means for obtaining a multi-media message comprising a sequence of information segments including graphical information segments represented in a first visually presentable form, textual information segments represented in an auditorily presentable form, and pointers pointing to the graphical information segments represented in the first visually presentable form, the pointers being represented in the auditorily presentable form and interspersed among the textual information segments represented in the auditorily presentable form such that the interspersed pointers together define said sequence of information segments in the multi-media message;

processor means for converting representation of the graphical information segments from the first visually presentable form into a second visually presentable form;

processor means for converting representation of the textual information segments from the auditorily presentable form into the second visually presentable form; and means for interspersing the graphical information segments represented in the second visually presentable form among the textual information segments represented in the second visually presentable form in place of the pointers such that each pointer pointing to a corresponding graphical information segment is replaced by said corresponding graphical information segment in the second visually presentable form in said sequence among the textual information segments represented in the second visually presentable form; and means for collectively presenting said sequence of textual information segments represented in the second visually presentable form and the graphical information segments represented in the second visually presentable form in place of said multi-media message to a user.

20. The arrangement of claim 19 wherein:

the means for obtaining comprise means for receiving an integrated voice-and-fax message comprising a fax file including fax message segments and a voice file including voice message segments interspersed with voice pointers to the fax message segments;

the means for converting representation of the graphical information segments comprise means for converting the fax message segments into e-mail message segments;

the means for converting representation of the textual information segments comprises means for converting the voice message segments into e-mail message segments;

the means for interspersing comprises;

means for inserting the e-mail message segments converted from the fax message segments among the e-mail message segments converted from the voice message segments in place of the voice pointers; and the means for collectively presenting includes means for delivering an e-mail message comprising the e-mail message segments converted from the voice message segments and interspersed with the e-mail message segments converted from the fax message segments, to a recipient instead of the received message.

21. A method of media conversion comprising the steps of:

obtaining information comprising voice message segments, fax message segments, and voice pointers pointing to the fax message segments, the voice pointers being interspersed among the voice message segments;

converting the voice message segments into e-mail message segments;

convening the fax message segments into e-mail message segments; and interspersing the e-mail message segments convened from the fax message segments among the e-mail message segments convened from the voice message segments in place of the voice pointers to form an e-mail message.

22. A media conversion arrangement comprising:

means for obtaining information comprising voice message segments, fax message segments, and voice pointers pointing to the fax message segments, the voice pointers being interspersed i among the voice message segments;

processor means for converting the voice message segments into e-mail message segments;

processor means for converting the fax message segments into e-mail message segments; and means for interspersing the e-mail message segments converted from the fax message segments among the e-mail message segments converted from the voice message segments in place of the voice pointers to form an e-mail message.

23. A method of media conversion, comprising the steps of:

identifying segments of information in a message comprising a sequence of segments of information represented in a first sensory medium in which the information is perceivable by the senses of a person, which identified segments can be represented in a second sensory medium in which the information is perceivable by the senses of a person, distinct from the first medium;

converting representation of the identified segments from the first sensory medium into the second sensory medium;

converting representation of other segments of the sequence of segments of information of said message from the first sensory medium into a third sensory medium in which the information is perceivable by the senses of a person, distinct from the first and the second media;

interspersing pointers, represented in the second sensory medium and pointing to the segments represented in the third sensory medium, among the segments represented in the second sensory medium such that each pointer pointing to a corresponding segment represented in the third sensory medium takes a place of said corresponding segment in said sequence among the segments represented in the second sensory medium; and presenting the segments represented in the third sensory medium and the sequence of the segments represented in the second sensory medium with interspersed said pointers represented in the second sensory medium as a multi-media message to a user.

24. A method of media conversion comprising the steps of:

obtaining a multi-media message comprising a sequence of information segments including first information segments represented in a first sensory medium in which the information is perceivable by the senses of a person, second information segments represented in a second sensory medium in which the information is perceivable by the senses of a person, distinct from the first medium, and pointers represented in the second sensory medium and pointing to the first information segments, the pointers being interspersed among the information segments represented in the second sensory medium such that the second information segments represented in the second sensory medium with the interspersed pointers together define said sequence of information segments in the multi-media message;

converting representation of the first information segments from the first sensory medium into a third sensory medium in which the information is perceivable by the senses of a person, distinct from the first and the second media;

converting representation of the second information segments from the second sensory medium into the third sensory medium; and interspersing the first information segments represented in the third sensory medium among the second information segments represented in the third sensory medium in place of the pointers such that each pointer pointing to a information segment represented in the third sensory corresponding first information segment is replaced by said corresponding first among the second information segments represented in the third sensory medium; and presenting said sequence of the second information segments represented in the third sensory medium and the first information segments represented in the third sensory medium as a message instead of said multi-media message to a user.

25. A media-conversion arrangement comprising:

means for identifying segments of information in a message comprising a sequence of segments of information represented in a first sensory medium in which the information is perceivable by the senses of a person, which identified segments can be represented in a second sensory medium in which the information is perceivable by the senses of a person, distinct from the first medium;

processor means for converting representation of the identified segments from the first sensory medium into the second sensory medium;

processor means for converting representation of other segments of the sequence of segments of information of said message from the first sensory medium into a third sensory medium in which the information is perceivable by the senses of a person, distinct from the first and the second media;

means for interspersing pointers, represented in the second sensory medium and pointing to the segments represented in the third sensory medium, among the segments represented in the second sensory medium such that each pointer pointing to a corresponding segment represented in the third sensory medium takes a place of said corresponding segment in said sequence among the segments represented in the second sensory medium; and means for presenting the segments represented in the third sensory medium and the sequence of the segments represented in the second sensory medium with interspersed said pointers represented in the second sensory medium as a multi-media message to a user.

26. A media conversion arrangement comprising:

means for obtaining a multi-media message comprising a sequence of information segments including first information segments represented in a first sensory medium in which the information is perceivable by the senses of a person, second information segments represented in a second sensory medium in which the information is perceivable by the senses of a person, distinct from the first medium, and pointers pointing to the first information segments represented in the first sensory medium, the pointers being represented in the second sensory medium and interspersed among the information segments represented in the second sensory medium such that the second information segments represented in the second sensory medium with the interspersed pointers together define said sequence of information segments in the multi-media message;

processor means for converting representation of the first information segments from the first sensory medium into a third sensory medium in which the information is perceivable by the senses of a person, distinct from the first and the second media;

processor means for converting representation of the second information segments from the second sensory medium into the third sensory medium; and means for interspersing the first information segments represented in the third sensory medium among the second information segments represented in the third sensory medium in place of the pointers such that each pointer pointing to a corresponding first information segment is replaced by said corresponding first information segment represented in the third sensory medium in said sequence among the second information segments represented in the third sensory medium; and means for presenting said sequence of the second information segments represented in the third sensory medium and the first information segments represented in the third sensory medium as a message instead of said multi-media message to a user.

27. A method of media conversion, comprising the steps of:

receiving an integrated voice-and-fax message comprising a fax file including fax message segments and a voice file including voice message segments interspersed with voice pointers to the fax message segments;

converting the fax message segments into e-mail message segments;

converting the voice message segments into e-mail message segments;

inserting thee-mail message segments converted from the fax message segments among the e-mail message segments converted from the voice message segments in place of the voice pointers; and delivering to a recipient an e-mail message comprising the e-mail message segments converted from the voice message segments and interspersed with the e-mail message segments converted from the fax message segments, instead of the received message.

28. A media conversion arrangement comprising:

means for receiving an integrated voice-and-fax message comprising a fax file including fax message segments and a voice file including voice message segments interspersed with voice pointers to the fax message segments;

processor means for converting the fax message segments into e-mail message segments;

processor means for converting the voice message segments into e-mail message segments;

means for inserting the e-mail message segments converted from the fax message segments among the e-mail message segments converted from the voice message segments in place of the voice pointers; and means for delivering an e-mail message comprising the e-mail message segments converted from the voice message segments and interspersed with the e-mail message segments converted from the fax message segments, to a recipient instead of the received message.

\* \* \* \* \*